Jan. 14, 1947. A. B. MODINE 2,414,159
RADIATOR CONSTRUCTION
Filed April 19, 1943
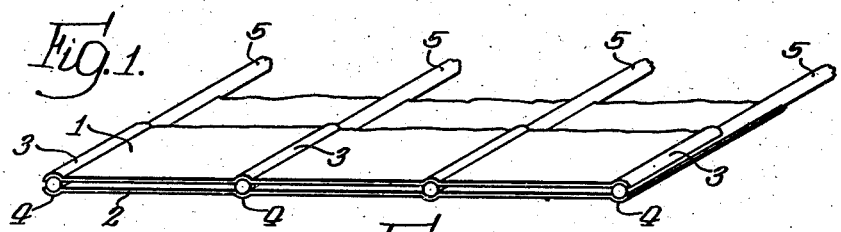
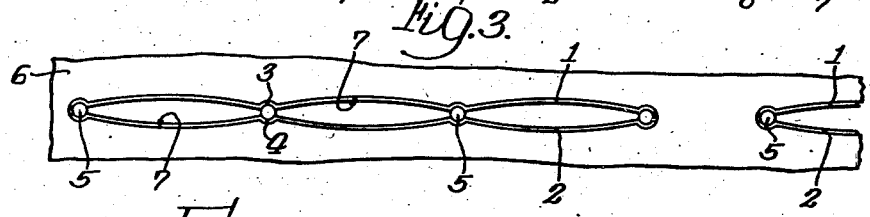
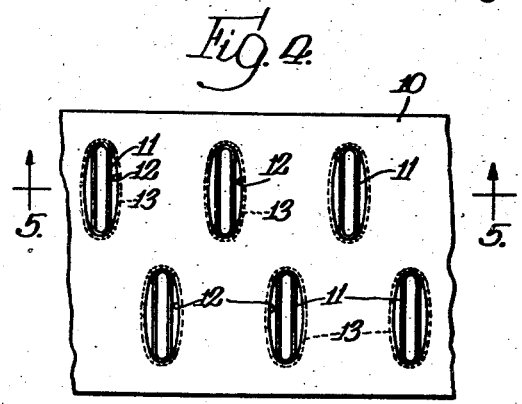
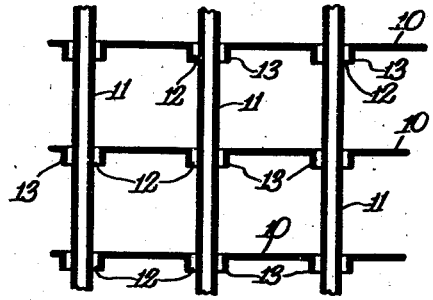
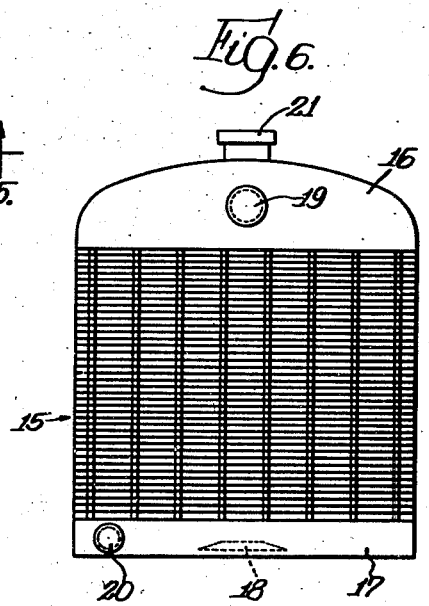
INVENTOR.
Arthur B. Modine,
BY
Attys.

Patented Jan. 14, 1947

2,414,159

UNITED STATES PATENT OFFICE 2,414,159

RADIATOR CONSTRUCTION

Arthur B. Modine, Racine, Wis., assignor to Modine Manufacturing Company, Racine, Wis., a corporation of Wisconsin Application April 19, 1943, Serial No. 483,581

5 Claims. (Cl. 257—130)

The present invention is directed to a new and novel combination of tubes and fins arranged and shaped for easy assemblage and to provide a well-built core that can be used in various types or kinds of heat interchanger installations. One of the essential requisites for producing a good substantial core for heat exchange devices is that the tubular elements of that core are intimately joined with the edges of the openings in the core fins to obtain the highest degree of heat transfer efficiency in such a unit. One of the better known methods of producing radiator cores in the past has been to provide the fins with openings which will snugly receive the tubular elements therethrough, such tubes being assembled with the fins by forcing the respective members together either manually or by mechanical means.

It is one of the main objects of the present invention to provide a combination of tubes of a certain shape and fins with openings so shaped as to relatively loosely receive the tubes therein so as to have a composite core unit which is easily and quickly assembled prior to the bonding of the various parts thereof into a strong and rigid core.

Another object of the present invention is to shape the tubes and the fin openings therefor in such a manner that these respective elements will coact to frictionally hold each other in place when assembled prior to the heating and bonding of such parts.

Another object of the present invention is to loosely assemble a plurality of tubes and fins wherein the adjacent portions thereof do not have intimate fitting contact, and to provide a method for causing subsequent intimate contact between the respective core elements during the baking or heating of the assembled parts under the influence of the temperatures that are usually required to produce and effect the bonding of the elements.

In the present core construction a well known typical solder can be used upon the core elements that will melt at approximately 450 degrees Fahrenheit and which will subsequently solidify at approximately 385 degrees Fahrenheit. As a result, the use of such solder in connection with the respective tube and fin elements of the present core construction, there will be substantially no contraction between the adjacent soldered parts of the core by the time that the solder has solidified so that the tubes will be firmly bonded to the peripheral or marginal edges of the holes that are formed in the fins. Also, such bonding of the respective parts will occcur a considerable time before the internal pressure, to which the core is being subjected during the heating process, will have contracted within such core.

Another feature of the present invention is the method of producing or building up a pressure within the assembled core tubes through the use of various substances which may be introduced into the sealed core and that are directly expandable from the heat of the baking process. The substances to be used in creating the internal core pressure during the heating process will vary with the kind and gauge of tube. A small quantity of water would be sufficient to generate enough steam pressure within certain cores having light tubes, to produce the necessary expansion or bulging of the walls of the tubes during the baking and bonding process. In other cases where heavier gauge tubes are used, other materials such as dry ice or ether may be used to generate higher pressures within the confines of a core for the purpose of producing the necessary expansion of the tubes to fit the openings in the fins during bonding.

One of the other advantages inherent in the arrangement and assembly of the various parts of the present core is the ability to utilize different kinds of metals in carrying out the objects of the present invention. It is preferable to use brass for the tubes, although copper or possibly some ferrous metals can be used for the same purpose. In all cases the tubes are prefabricated with the use of complementary or duplicate flat sheets of metal that are suitably spaced by means of wires or other spacing members, and the tubes thus formed all have chambers that are substantially elongated with the metal wall portions thereof forming comparatively flat and narrow fluid spaces.

Other objects and advantages inherently associated with the core constructions of the present invention shall hereinafter appear in the following detailed description with reference to the accompanying drawing.

In the drawing:

Fig. 1 is a fragmentary perspective view of a preferred form of tube construction adapted for assembly with the fins of a radiator core;

Fig. 2 is a plan view of a fragmentary portion of a fin as assembled with a tube or tubes such as illustrated in Fig. 1 and prior to being subjected to the baking or bonding process;

Fig. 3 is another fragmentary view corresponding to the view in Fig. 2 but after the core assembly has been subjected to the baking or bonding process;

Fig. 4 is a fragmentary plan view of a modified fin and tube construction as assembled prior to the heating or bonding process;

Fig. 5 is a sectional view taken substantially along the line 5—5 in Fig. 4 to more or less diagrammatically illustrate the arrangement of the tubes and fins before tube expansion and rigid assembly thereof through the baking process; and Fig. 6 is a diagrammatic view of a radiator incorporating a core of the present construction and illustrating generally such a unit as assembled and sealed for the purpose of tube expansion and union with the fins during the heating process.

The tube illustrated in Fig. 1 or tubes similar thereto are fabricated through a suitable electric welding process or by a suitable heat rolling process substantially as disclosed and described in a co-pending application of Arthur B. Modine, Serial No. 483,582, filed April 19, 1943, issued as Patent No. 2,396,522 dated March 12, 1946.

The tube in Fig. 1 is preferably constructed of two wall sections of any suitable relatively thin metal such as illustrated at 1 and 2, and such walls are provided with the beads 3 and 4 respectively for the reception of wire spacers 5, such assembly comprising a multiple form of tube. Such tubes as illustrated in Fig. 1 are then readily assembled with fin members as illustrated in Fig. 2 provided with contiguous scalloped tube openings such as shown at 7. Obviously, as shown in Fig. 2, it will require three consecutive openings such as 7 for accommodating one tube structure. The projecting and joining portions 8 of the adjacent openings 7 are shaped to receive the beaded portions 3 and 4 of the tube structure.

In Fig. 3, the completely finished and bonded core structure is illustrated. By sealing the tubes of the radiator structure in any suitable manner and by introducing the required or necessary pressure within the tubes, the side wall portions thereof or of the consecutive sections of the tubes are expanded to snugly and intimately fit and conform with the openings provided for the tubes in the fins 6. The pressure created is preferably created by interposing a suitable substance into the radiator core or tubular structure thereof that will become greatest and most effective during the baking or heating process to which the core is subjected for the purpose of bonding the various elements of the cores together into a rigid assembly. Therefore, after the tubes such as illustrated in Figs. 1 to 3 inclusive have been expanded during the heating process, such tubes will be in intimate contact with the margins of the fin openings and will be bonded thereto to be retained in such intimate contact and in conformance with the shape of the openings after such core has cooled.

Referring to Figs. 4 and 5, the radiator comprises a combination of fins 10 having a plurality of single tubes 11. In this case the openings 12 in the fins are provided with the flanges 13 for the purpose of providing a greater surface contact between the respective tubes 11 and the fins 10. In the modified construction of radiator core illustrated in Figs. 4 and 5, it is to be noted that the tube similar to the tubes shown in Fig. 1 is of relatively narrow and long construction which is most efficient in providing a more flexible arrangement of tube for fitting the fin openings provided therefor under the internal pressure method explained. The flanges 13 not only provide for greater bonding surface contact between the parts, but form reinforcing means to prevent distortion of the fin openings when the force of the expanding tubes reacts against the opening edges.

In Fig. 6 a core 15 is diagrammatically shown as assembled with headers 16 and 17, solder having been applied to the core parts in a conventional manner and the core having been assembled with the parts in the relation shown in Figs. 2 or 4 of the present invention, the core now being adapted for bonding in the manner hereinbefore explained. By adding any suitable pressure producing medium such as, for example, a portion of dry ice, which is solidified carbon dioxide, as shown at 18 in Fig. 6 and by sealing the inlet 19 and outlet 20 together with the filler opening 21, the entire radiator unit can be subjected to the usual baking or heating process temperature. During this process the tubes will be expanded into the excess portion of the fin openings and against the edges thereof and therewith the tubes will assume the contours of said openings and will be held in such position after the bonding of the parts through the solidifying of the brazing material. It is to be observed that initially the tubes are of elongated cross section, and that the contours of the openings in the fins are different from the contours of the tubes and that in the finished product the expanded tubes assume the contours of the openings.

In some instances it is possible to merely utilize the expanded air pressure within a sealed structure for the purpose of expanding the tube as explained. It is also conceivable that the necessary union of parts may be carried out under other conditions and by other means than the usual baking process hereinbefore referred to.

In using various arrangements of tubes in combination with suitably provided fin openings for accommodating such tubes it is possible to thereby produce a radiator core that can be easily assembled with a minimum of difficulty and which will eventually result in a structure having intimate contact between the various parts of the tube elements of a heat exchange unit, all of which features are accomplished in a manner hereinbefore set forth.

Having thus described the present invention, it is obvious that various immaterial modifications may be made without departing from the breadth and scope of the present invention. Therefore, no limitations should be placed on the exact form, construction, arrangement and combination of parts herein shown and described or to the uses mentioned excepting as shall be determined by the breadth and scope of the appended claims.

What I claim as new and desire to secure by Letters Patent is:

1. The method of assembling a core of a heat exchange device having tubes and fins, consisting of providing tubes with expandable parallel sided walls, providing fins with oval openings therein having clearance for the tubes, inserting the tubes in the fin openings, sealing the tubes and expanding the tubes by fluid pressure to cause the tube walls to expand against the edges of the fin openings and assume the oval contour thereof and simultaneously bonding the tubes to the fins.

2. The method of producing a core of a heat exchange device having tubes and fins, consisting of providing spaced tube strips, assembled with wire spacers interposed therebetween at their side edges and at intermediate places therebetween, providing fins with scalloped holes therein, inserting said tube strips and wire spacers in said holes in the fins, the edges of which holes are bowed away from said tube strips at the places between the wire spacers, sealing the tubes formed by said tube strips and wire spacers, and introducing excessive internal pressure therein to cause the parts of the tube strips intermediate the wire spacers to expand against the edges of the holes, and bonding the tubes and fins in such relation.

3. The method of producing a core of a heat exchange device having tubes and fins, consisting of inserting tube units composed of spaced tube strips with wire spacers interposed therebetween along their side edges and intermediate said side edges, through elongated holes in the fins, the edges of which holes bulge outwardly between the wire spacers, sealing the tube units, introducing excessive internal pressure therein to cause the parts of the tube strips intermediate the wire spacers to expand against the bulged edges of said holes and bonding the tubes and fins in such relation.

4. A radiator core having a plurality of tubes and fins, said tubes each comprising opposing walls connected together in spaced relation to each other by wire spacers disposed therebetween in opposing grooves formed in the walls at certain intervals, said walls of the tubes being bulged outwardly between the wire spacers, and said fins each having holes therein for the reception of the tubes therethrough, said holes each having the marginal edges thereof in intimate contact with the bulged walls of said tubes and bonded thereto.

5. A radiator core having tubes and fins, said tubes each comprising a pair of tube strips connected in spaced relation to each other by means of two or more parallel wire spacers, disposed therebetween in opposing grooves formed in said walls, the latter being outwardly bulged between said wire spacers, said fins having openings therein for each tube, the edge of each opening in the fins being in intimate contact with the tubes.

ARTHUR B. MODINE.